Patented Oct. 18, 1949

2,484,833

UNITED STATES PATENT OFFICE 2,484,833

6-ALKOXY-i-ANDROSTENE-17-OLS

Percy L. Julian, Maywood, John W. Cole, Chicago, Arthur Magnani, Wilmette, and Edwin W. Meyer, Chicago, Ill., assignors to The Glidden Company, Cleveland, Ohio, a corporation of Ohio No Drawing. Application July 29, 1944, Serial No. 547,306

2 Claims. (Cl. 260—397.5)

In the preparation of testosterone from androstenediol it is necessary to operate upon one of the hydroxy groups while the other is protected in a suitable manner. Heretofore such protection has resided in the preparation of mono esters of androstenediol. These mono esters are at best difficult to prepare and the only satisfactory procedure hitherto suggested has been that of partial saponification of the diesters bringing about a free hydroxyl group in the 3 position followed by oxidation to produce an ester of testosterone.

In the above described procedure it is obvious that the 17-hydroxyl group must always be protected during the oxidation of the 3-hydroxy group to a 3-keto group.

According to the present invention we are describing the preparation of a new type of intermediate which will be found useful in that this intermediate obviates the necessity of protecting the hydroxy group in the 17-position during the introduction of a keto group into the 3-position.

It is, therefore, an object of the present invention to provide new compounds in the steroid series.

A further object is to provide a process for preparing said new compounds.

Another object is to provide new intermediates suitable for the preparation of physiologically active substances.

Other objects will be apparent to those skilled in the art from the following description.

It has been found that the foregoing objects may be realized by preparing derivatives of i-dehydroandrosterone and subjecting these derivatives to reduction in order to convert the 17-keto group into a 17-hydroxy group. This reduction may be accomplished by alkaline reducing agents such as alkali metal-alcohol combinations, by aluminum alcoholates and by catalytic hydrogenation in the presence of Raney nickel. Reduction under acid conditions should be avoided in view of the instability of the i-structure under certain acidic conditions.

Among the i-derivatives of dehydroandrosterone which may be used may be mentioned i-ethers, i-alcohols, i-amines and i-esters.

These 17-hydroxy-i compounds can be converted into the 3-keto-17-hydroxy compound by first treating them with ammonia or amines whereby under suitable conditions 3-amino derivatives are obtained, then converting the 3-amines into N-halo derivatives which on treatment with alkali followed by acid hydrolysis yield testosterone.

The following examples will serve to illustrate the invention:

EXAMPLE 1

*Reduction with aluminum isopropoxide in isopropyl alcohol*

To a solution of 10 grams of i-dehydroandrosterone methyl ether in 250 ml. of anhydrous isopropyl alcohol, 15 g. of aluminum isopropoxide was added. The mixture was refluxed for fourteen hours. At hour intervals, the acetone was separated through a 100 cm. Vigreaux column. The presence of acetone in the distillate was checked with 2,4-dinitrophenyl hydrazine reagent. The volume was kept at 250 ml. by the addition of isopropyl alcohol. The distillate gave no test for acetone during the last several hours of reaction. The reaction mixture was diluted with water containing hydrochloric acid and extracted with ether. The ether extract was washed several times with dilute hydrochloric acid, then water followed by a sodium carbonate solution. After several washings with water, the ether solution was dried and concentrated. The yellow sirup remaining after complete removal of solvent weighed 9.8 g. This was crystallized from acetone yielding a first crop of 4.5 g. of a white crystalline solid melting at 134–140°. Several recrystallizations from acetone gave white prisms melting at 146–147.5°. $[\alpha]_D^{28} = 49.5°$ (79.9 mg. made up to 5 ml. with chloroform, $[\alpha]_D^{28}$ 0.79, 1, 1 dm.).

EXAMPLE 2

*Reduction with sodium in n-propyl alcohol*

A solution of 13.2 g. of i-dehydroandrosterone methyl ether in 400 ml. of n-propyl alcohol was heated on a steam bath under reflux. 33 g. of sodium metal was added in small portions over a period of three to four hours. Toward the end of the reaction time, another 150 ml. of n-propyl alcohol was added to bring the reaction to completion. 200 ml. of water was added to the chilled mixture. After shaking in a separatory funnel, the aqueous layer was drawn off, and the alcohol layer steam distilled. The residue, a solid when cold, was dissolved in ether. The ether solution was washed free of alkali with water, dried and concentrated. The yellow sirup, 13.5 g., crystallized from acetone yielding 8.1 g. of a white solid melting at 135–144°. Recrystallization from acetone raised the melting point to 145–147°.

EXAMPLE 3

*Reduction with sodium in n-amyl alcohol*

In the same manner as described above, 11.5 g. of i-dehydroandrosterone methyl ether in 500 ml. of n-amyl alcohol was reduced with 23 g. of sodium metal. The temperature of reaction was about 100° C. The alcohol solution was shaken out with water and steam distilled. The residue, after being taken up in ether and washed with water, was crystallized from acetone. The first crop, 6.0 g. of white crystalline solid melted at 136–144°. A second crop from acetone-petroleum ether amounted to 2.0 g.

EXAMPLE 4

*Hydrogenation of i-dehydroandrosterone methyl ether*

A mixture of 6 grams of i-dehydroandrosterone methyl ether, 80 cc. absolute ethanol and 2 grams of Raney nickel catalyst was shaken with hydrogen at 40 lbs. pressure at 25° C. until the calculated drop in pressure was obtained. The product was filtered, concentrated to a syrup, then crystallized from 10 cc. acetone, giving as 1st and 2nd crops 3.4 grams (55% of the theoretical amount) of 6-methoxy-i-androsten-17-ol melting at 133–135°. Recrystallization from acetone raised the melting point to 143–144°.

EXAMPLE 5

*Proof of structure of 6-methoxy-i-androstene-17-ol*

A solution of 1.0 g. of 6-methoxy-i-androstene-17-ol in 50 ml. of anhydrous methanol containing ten drops of concd. sulfuric acid was refluxed for two and one-half hours. The solid which separated on dilution with water was filtered, washed with water and dried. The dry solid was crystallized from acetone. The first crop of white crystals, 0.5 g., melted at 140–142°. This upon recrystallization from acetone yielded fine plates melting at 141–143°. This compound, 3-methoxy-5-androstene-17ol, was synthesized from dehydroandrosterone p-toluene-sulfonate in the following manner.

2.0 g. of dehydroandrosterone p-toluenesulfonate in 50 ml. of anhydrous methanol was refluxed for two hours. The solid which separated upon dilution with water was filtered, washed with water and dried. 1.4 g. of white solid melting at 135–141°. One recrystallization from methanol gave 1.1 g. of white needles which melted at 141–142°.

The 3-methoxy-5-androstene-17-one (1.0 g.) was reduced with 4 g. of sodium in 40 ml. of n-propyl alcohol. The reaction mixture was diluted with water and extracted with ether. The ether layer was washed several times with water, once with dilute hydrochloric acid, twice with water and dried. The residue from the ethereal solution, 0.9 g., was crystallized from acetone yielding 0.7 g. of a white plate melting at 139–143°. Another crystallization from the same solvent raised the melting point to 142–144°. This gave no depression in melting point when mixed with 3-methoxy-5-androstene-17-ol, but gave a distinct depression when mixed with 6-methoxy-i-androstene-17-ol.

Having described the invention, what we claim is:

1. As a product, 6-methoxy-i-androstene-17-ol of the formula

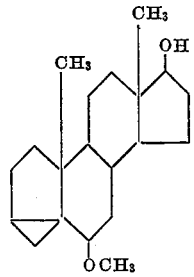

2. As products, the 6-alkoxy-i-androstene-17-ol compounds of the general formula

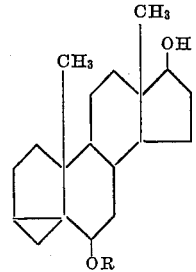

in which R is a lower alkyl group.

PERCY L. JULIAN.
JOHN W. COLE.
ARTHUR MAGNANI.
EDWIN W. MEYER.

REFERENCES CITED

The following references are of record in the file of this patent:

UNITED STATES PATENTS

| Number | Name | Date |
|---|---|---|
| 2,173,425 | Ruzicka | Sept. 19, 1939 |
| 2,182,825 | Serini | Dec. 12, 1939 |
| 2,192,935 | Schoeller | Mar. 12, 1940 |

FOREIGN PATENTS

| Number | Country | Date |
|---|---|---|
| 823,618 | France | Oct. 18, 1937 |